United States Patent
Shibata et al.

(10) Patent No.: US 11,134,698 B2
(45) Date of Patent: Oct. 5, 2021

(54) METHODS OF CRYSTALIZING AMORPHOUS LACTOSE ON A SOLID SURFACE AND SOLIDS MADE THEREBY

(71) Applicant: Meiji Co., Ltd., Tokyo (JP)

(72) Inventors: Mitsuho Shibata, Kanagawa (JP); Kazumitsu Ohtsubo, Kanagawa (JP); Yoshinori Satake, Kanagawa (JP); Kazunori Kashiwagi, Kanagawa (JP)

(73) Assignee: Meiji Co., Ltd., Tokyo (JP)

( * ) Notice: Subject to any disclaimer, the term of this patent is extended or adjusted under 35 U.S.C. 154(b) by 0 days.

(21) Appl. No.: 16/690,364

(22) Filed: Nov. 21, 2019

(65) Prior Publication Data

US 2020/0163353 A1  May 28, 2020

Related U.S. Application Data

(60) Continuation of application No. 15/016,233, filed on Feb. 4, 2016, now abandoned, which is a division of application No. 13/699,642, filed as application No. PCT/JP2011/003331 on Jun. 13, 2011, now abandoned.

(30) Foreign Application Priority Data

Jun. 13, 2010 (JP) .................. 2010-134612

(51) Int. Cl.
  *A23C 9/18*  (2006.01)
  *A23L 33/00*  (2016.01)
  *A23C 9/16*  (2006.01)
  *A23P 10/28*  (2016.01)

(52) U.S. Cl.
  CPC ............... *A23C 9/18* (2013.01); *A23C 9/16* (2013.01); *A23L 33/40* (2016.08); *A23P 10/28* (2016.08); *A23V 2002/00* (2013.01)

(58) Field of Classification Search
  CPC ....................................... A23C 9/18
  See application file for complete search history.

(56) References Cited

U.S. PATENT DOCUMENTS

2008/0292770 A1* 11/2008 Shibata .............. A23C 9/16
                                                                 426/588

OTHER PUBLICATIONS

Schuck et al., "Lactose cryatallization: determination of α-lactose monohydrate in spray-dried dairy products"—Lait, 82, 2002, p. 413-421. (Year: 2002).*

* cited by examiner

*Primary Examiner* — Elizabeth Gwartney
(74) *Attorney, Agent, or Firm* — Osha Bergman Watanabe & Burton LLP

(57) ABSTRACT

The object of invention is to provide solid milk with favorable solubility and enough strength and the method of manufacturing the solid milk. The solid milk of the invention has X-ray diffraction pattern of its surface area that has a main peak of $2\theta=10\text{-}15°$ at $2\theta=10\text{-}11°$ or at $2\theta=12\text{-}13°$. A method for the manufacture of solid milk comprises compressing powdered milk to obtain compressed powdered milk; humidifying the compressed powdered milk to obtain humidified compressed powdered milk; and drying the humidified compressed powdered milk to obtain the solid milk. A part of amorphous lactose at the surface of the solid milk 12 is crystallized at the steps of humidifying step and drying.

19 Claims, 9 Drawing Sheets

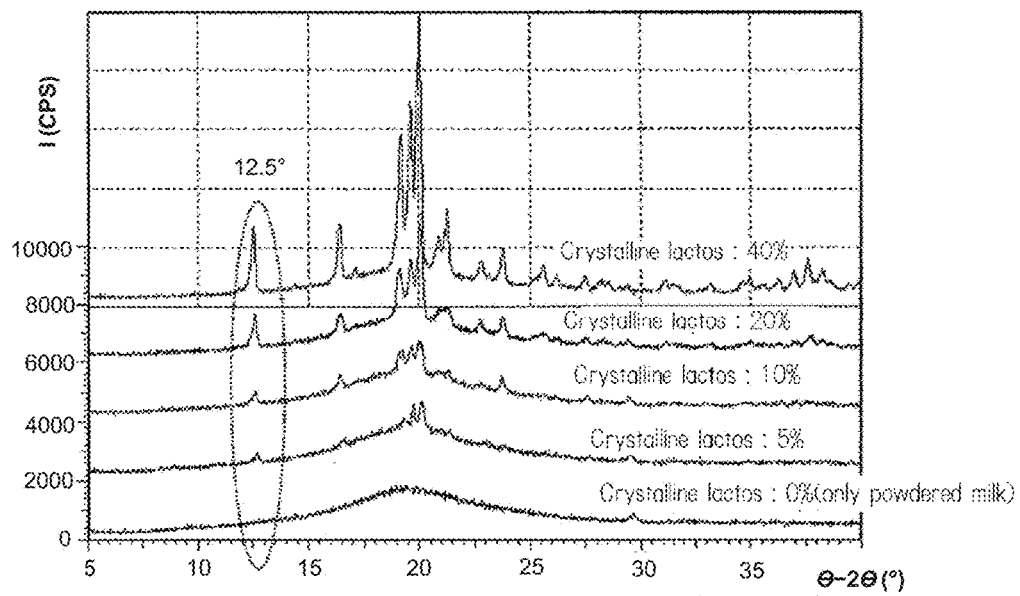
Fig. 2(a) Standard of α-type monohydrate crystalline lactose (Amount of physical mixed quantity)
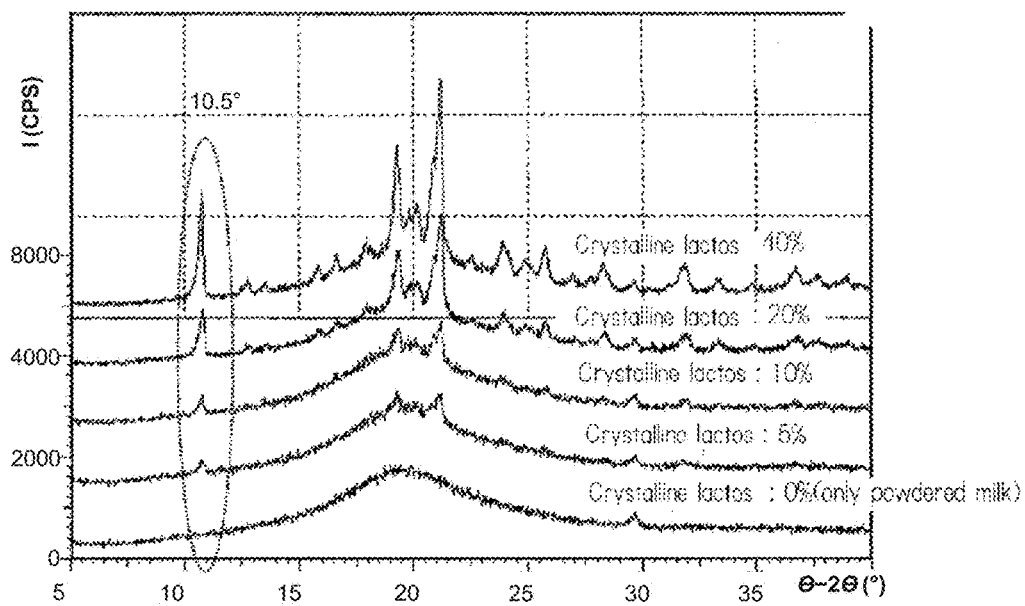
Fig. 2(b) Standard of β-type anhydrate crystalline lactose (Amount of physical mixed quantity)

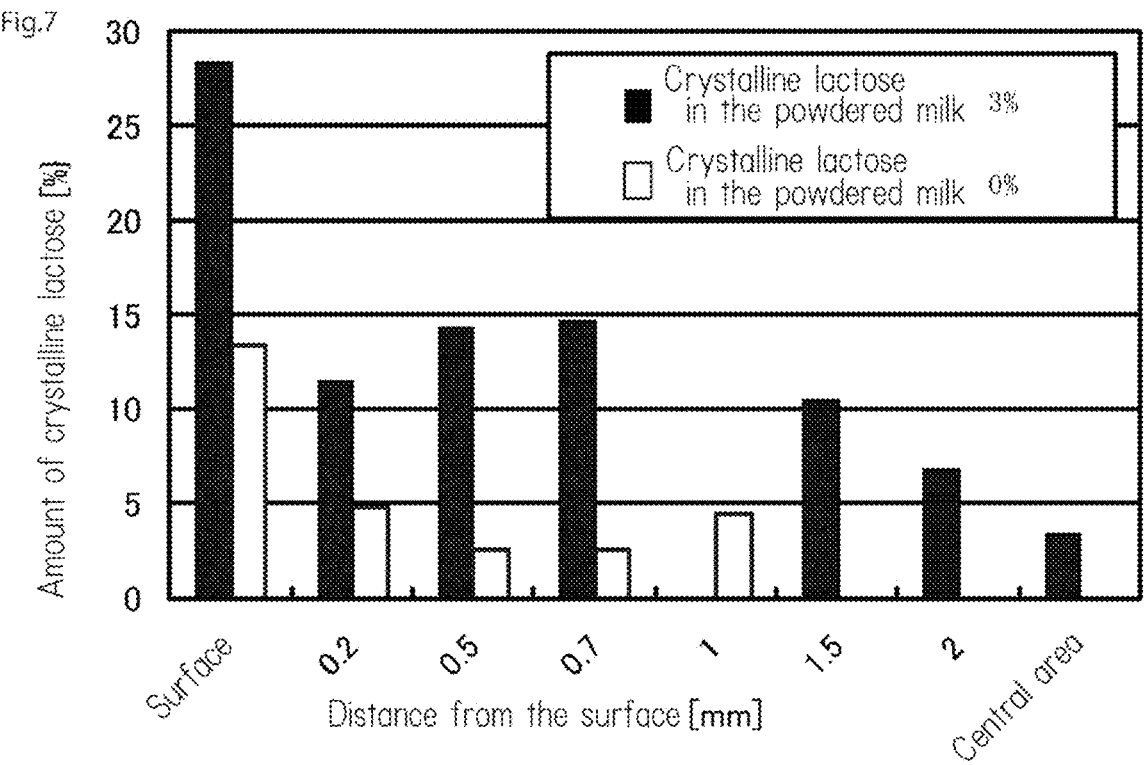

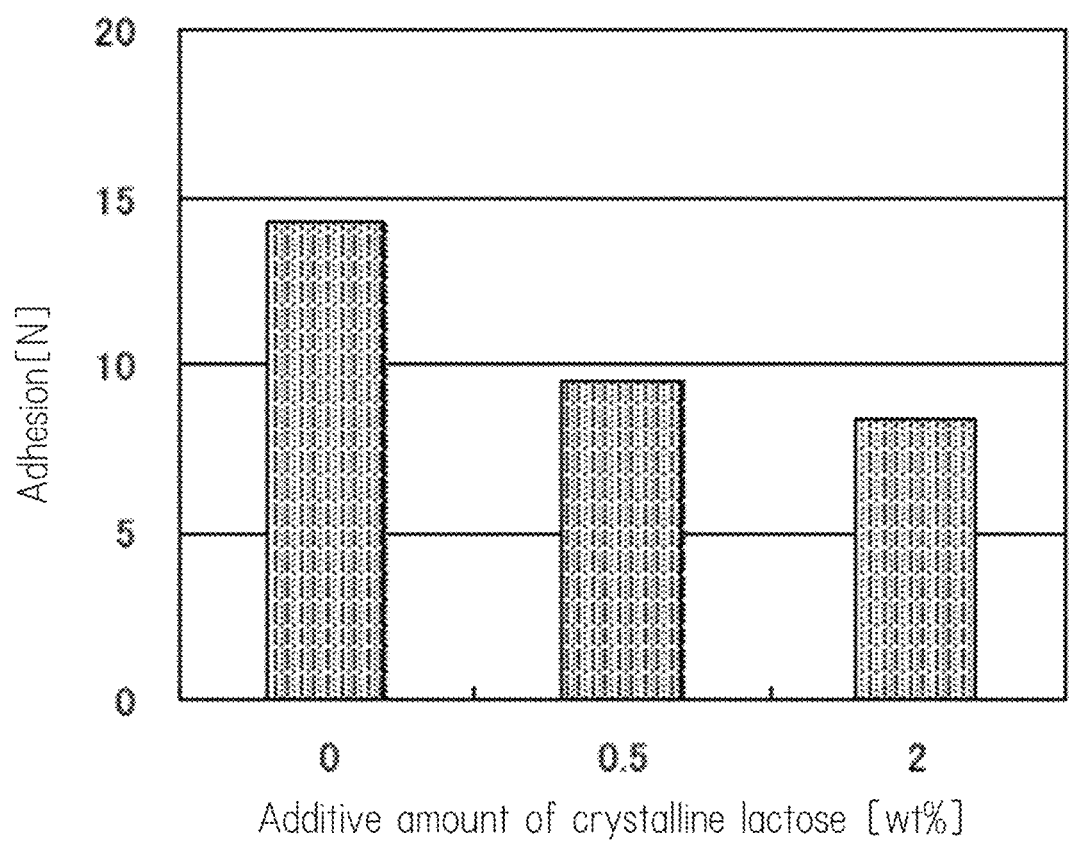

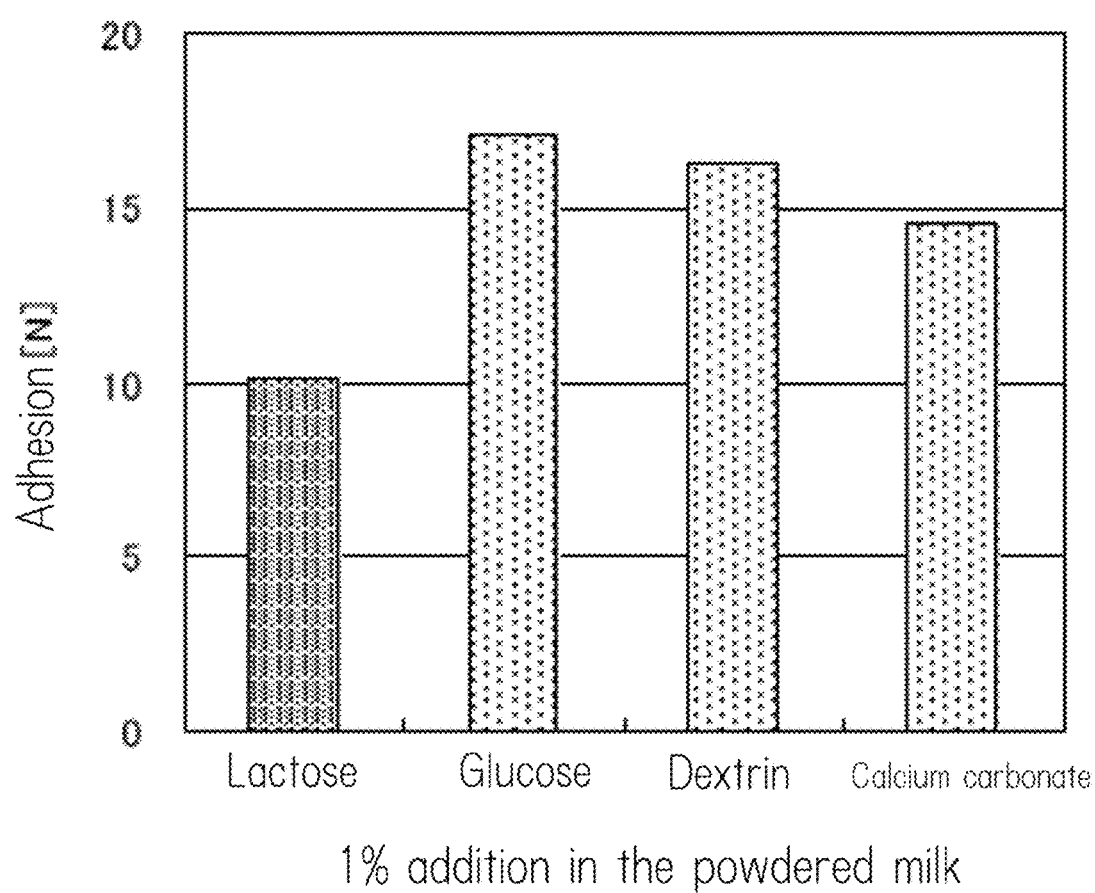

METHODS OF CRYSTALIZING AMORPHOUS LACTOSE ON A SOLID SURFACE AND SOLIDS MADE THEREBY

CROSS-REFERENCE TO RELATED APPLICATIONS

This application is a continuation application of U.S. patent application Ser. No. 15/016,233, filed Feb. 4, 2016, which is a divisional application of U.S. patent application Ser. No. 13/699,642, filed Nov. 23, 2012, which is a National Phase Application of International Application No. PCT/JP2011/003331, filed Jun. 13, 2011, which claims the benefit of Japanese Patent Application no. 2010-134612, filed Jun. 13, 2010, which are herein incorporated by references.

FIELD OF THE INVENTION

The present invention is directed to solid milk which is dissolved in hot water when the solid milk is drunk and the present invention is directed to the method for manufacturing the solid milk. More specifically, the present invention relates to solid milk which has preferred solubility and strength.

DESCRIPTION OF THE RELATED ART

Powdered milk is a food product whose life is improved by removing almost all of the necessary moisture for the microbial growth from bovine milk and the like. Since the capacity and weight decrease by removing moisture, the powdered milk can be easily transported. Thus, the powdered milk has advantages in life and transportation. The powdered milk has interspaces between milk powders, and the porosity of the milk powder is generally 60% to 70%, so that it readily dissolves in hot water. However, the powdered milk requires measurement of proper quantity every time it is dissolved in, for example, hot water. Further, upon measurement of the powdered milk or upon taking out the powdered milk, the powdered milk may spread. Therefore, solid milk made by powdered milk that is solid state has been proposed (the patent document 1. Japanese Utility Model Application Laid-Open Publication No. SHO49-130189, and the patent document 2, Japanese Utility Model Application Laid-Open Publication No. SHO61-118280). However, it has not been easy to actually make the powdered milk into solid state and satisfy both of strength and solubility. Namely, even if the powdered milk is made into solid state, it has been easy to break and has been hard to handle. Moreover, the solid milk has smaller surface area as that of powdered milk, and thus solid milk has less solubility in hot water.

The patent document 3, Japanese Patent No. 4062357, discloses the method for manufacturing solid milk. The method compresses powdered milk, first. Then the method humidifies and dries the compressed powdered milk. The solid milk obtained by the method has porosity of specific range and predetermined amount of free fat. Thus the solid milk has sufficient strength and solubility. The solid milk disclosed in the document superior to previous solid milk. However, it is desired to provide further progressed solid milk in a view point of solubility and strength.

In the field of medicine, various "intraoral fast disintegrable tablets" readily soluble in the mouth have been developed.

For example, the patent document 4, Japanese Patent Application Laid-Open Publication No. Hei 11-012161, discloses the technique for manufacturing "intraoral fast disintegrable tablets" with high strength. The technique compresses medicament, a water soluble diluents and amorphous sugar and then aging the compressed ingredient so as to manufacture such tablets by means of conventional compressor with few steps.

The patent document 5, Japanese Patent Application Laid-Open Publication No. Hei 11-349475, discloses the method for easily and effectively manufacturing intraoral fast disintegrable tablets that have enough strength to be handled under high humid circumstances and that are dissolved in a mouth quickly. The method exposures tablets, which has about 5 to 40 wt % of amorphous lactose, which is compressed at low pressure under humid circumstance with relative humidity of about 60% to 90% so as to change amorphous lactose to crystalline lactose. The patent document 6, WO 95/20380, discloses the technique to manufacture compressed materials that has quick dissolubility in a mouth and sufficient strength to be dealt in manufacturing processes and transporting processes. The method uses the first sugar that has quick dissolubility but low formability and the second sugar that has high formability to make tablet. The technique uses lactose and mannitol as the first low formability sugar and it uses maltose and maltitol as the second high formability sugar.

However, these techniques are directed to manufacturing medicament and the requirement and conditions are different from those of solid milk of the present invention. Generally speaking, medicaments contain small amount of active ingredients. Namely, intraoral fast disintegrable tablets may comprise large amount of additives and thus it is easy to control dissolubility and strength of intraoral fast disintegrable tablets. Just controlling additives, it is possible to obtain intraoral fast disintegrable tablets with high dissolubility and enough strength. Furthermore, intraoral fast disintegrable tablets do not contain fat contrary to powdered milk. Still further a piece of intraoral fast disintegrable tablet generally has small volume. Thus it is impossible to utilize the technique of high dissolubility in manufacturing intraoral fast disintegrable tablets into the method of manufacturing solid milk. The intraoral fast disintegrable tablets are required to be dissolved quickly by means of little water in a mouth. Contrarily, solid milk is dissolved in hot water and usually is not taken directly by mouth. Thus the required dissolubility of solid milk is not high as required by intraoral fast disintegrable tablets. In medicament, strength of medicament may be attained by adding other ingredients to pure amorphous sugar. In case of manufacturing solid milk, powdered milk is manufactured by spray dry process using liquid that comprises various components. Thus the amorphous lactose dissolves in other components to conform solid dispersion in granules. To manufacture solid milk that has sufficient strength by using such granules, which has various components as well as amorphous lactose, is difficult compared with making medicament. Thus the methods for manufacturing medicaments are not directly used as the method for manufacturing solid milk.

CITATION LIST

Patent Literature

[Patent Document 1] Japanese Utility Model Application Laid-Open Publication No. Sho 49-130189
[Patent Document 2] Japanese Utility Model Application Laid-Open Publication No. Sho 61-118280

[Patent Document 3] Japanese Patent Application Laid-Open Publication No. 4062357
[Patent Document 4] Japanese Patent Application Laid-Open Publication No. Hei 11-012161
[Patent Document 5] Japanese Patent Application Laid-Open Publication No. Hei 11-349475
[Patent Document 6] WO 95/20380

SUMMARY OF INVENTION

Problems to be Solved by the Invention

An object of the present invention is to provide solid milk that has a preferred solubility and strength and a method of making the same.

Another object of the present invention is to provide solid milk that is easy to handle in transportation and easy to be measured, and a method of making the same.

Another object of the present invention is to provide solid milk whose component composition is controllable with only nutritional component, and a method of making the same.

Another object of the present invention is to provide a method for manufacturing solid milk that can prevent powdered milk from attaching to trays.

Another object of the present invention is to provide method of making powdered milk and solid milk which can make not only the powdered milk but also the solid milk based on the powdered milk after making the powdered milk.

Means for Solving the Problem

The present invention basically based on the following new sight that when a part of amorphous lactose at the surface of solid milk is crystallized under the predetermined condition to be crystalline lactose then the solubility of solid milk as well as the strength of the solid milk increase. Namely at least one of the objects is solved by the following solid milk and the method for manufacturing the solid milk.

The first aspect of the present invention is directed to solid milk. The surface 12 of the solid milk has X-ray diffraction pattern that has a main peak of $2\theta=10\text{-}15°$ at $2\theta=10\text{-}11°$ or at $2\theta=12\text{-}13°$. The peak at the range of $2\theta=10\text{-}11°$ is considered to have relationship with anhydrous crystalline lactose. The peak at the range of $2\theta=12\text{-}13°$ is considered to have relationship with monohydrate crystalline lactose. The main peak of $2\theta=10\text{-}15°$ is at the range of $2\theta=10.25\text{-}10.75°$ or at the range of $2\theta=12.25\text{-}12.75°$.

The solid milk of the present invention intentionally comprises crystalline lactose at the surface of the solid milk. Generally speaking, when lactose of solid milk is completely crystallized, then the strength of the solid milk becomes extremely high. However, the solubility of such solid milk becomes extremely low. The present invention makes crystalline lactose to exist at the surface of the solid milk such that the solubility as well as the strength of the solid milk increases. We think that, because of the method of the present invention, only a part of the surface of the solid milk has crystalline lactose and then the surface of the solid milk has a hard layer that has holes or vacant spaces. The solid milk of the present invention has high strength because of the hard layer that has crystalline lactose. Further, when the solid milk is dissolved, hot water may enter into the holes or vacant spaces, which may be a net shaped, quickly. Thus the solid milk has high solubility.

The Ia/Ib of a preferred embodiment of the solid milk is equal to or more than 2.5. The Ia is a sum of:

an integrated intensity of a first region of X-ray diffraction pattern of the surface 12 of the solid milk, the center of the first region is a main peak of $2\theta=10\text{-}11°$ of the pattern and the width of the first region is twice of the full width of half maximum of said main peak of $2\theta=10\text{-}11°$; and an integrated intensity of a second region of X-ray diffraction pattern of the surface 12 of the solid milk, the center of the second region is a main peak of $2\theta=12\text{-}13°$ of the pattern and the width of the second region is twice of the full width of half maximum of said main peak of $2\theta=12\text{-}13°$.

The Ib is a sum of:

an integrated intensity of a first region of X-ray diffraction pattern of center area 11 of the solid milk, the center of the first region is a main peak of $2\theta=10\text{-}11°$ of the pattern and the width of the first region is twice of the full width of half maximum of said main peak of $2\theta=10\text{-}11°$; and an integrated intensity of a second region of X-ray diffraction pattern of the center area 11 of the solid milk, the center of the second region is a main peak of $2\theta=12\text{-}13°$ of the pattern and the width of the second region is twice of the full width of half maximum of said main peak of $2\theta=12\text{-}13°$.

The preferred embodiment of the solid milk is that the amount of crystalline lactose at the surface 12 of the solid milk is larger than that of crystalline lactose at center area 11 of the solid milk. The crystalline lactose includes anhydrous and monohydrate form. The preferred embodiment of the solid milk is that the Ia/Ib is from 2.5 to 15. The central area of the solid milk may have no crystalline lactose. The solid milk of the present invention has many of the crystalline lactose at its surface area and there is little crystalline lactose at the central area of the solid milk. The feature brings the solid milk of the present invention superior strength and solubility.

The preferred embodiment of the solid milk is that the amount of crystalline lactose at the surface 12 of the solid milk is larger than that of crystalline lactose at center area 11 of the solid milk. More concretely, a preferred embodiment of the solid milk is that wherein the amount of crystalline lactose at the surface 12 of the solid milk is more than 5 wt % larger than that of crystalline lactose at center area 11 of the solid milk. If all of the surface area of the solid milk is crystalline lactose, the solubility of it is not preferable. Thus a preferred embodiment of the solid milk is that the amount ratio of crystalline lactose and amorphous lactose at the surface 12 of the solid milk is 25:75 to 90:10.

Central area of the solid milk does not have to comprise much crystalline lactose. Thus a preferred embodiment of the solid milk is that the center area 11 of the solid milk does not contain crystalline lactose. The amount rate of crystalline lactose and amorphous lactose at the center area 11 of the solid milk may be less than 90:10, namely the weight ratio of crystalline lactose and amorphous lactose is less than 1/9.

The solid milk of the present invention has crystalline lactose at the surface area. The strength of solid milk increases when the layer that comprises crystalline lactose has thickness more than predetermined value. Thus a preferred embodiment of the solid milk is that the solid milk has 0.2 mm or more of a hard layer at the surface 12 of the solid milk. The hard layer of the solid milk may comprise more than 10 wt % of crystalline lactose. When the solid milk has a hard layer which comprises crystalline lactose more than predetermined amount, the solid milk has enough strength.

A preferred embodiment of the solid milk is that the volume of the solid milk is from 1 cm$^3$ to 50 cm$^3$. This solid milk has larger volume than that of powdered milk and it makes easy to calculate suitable amount of the solid milk and it makes solid milk to be convenient to be transported.

A preferred embodiment of the solid milk is that when a force, which is caused by a load, in the direction of short axis of the solid milk causing the solid milk be broken is 30 N to 300 N when the solid milk has a rectangular solid shape. The solid milk of the embodiment has sufficient strength and thus it is possible for the solid milk from being broken in transport. When solid milk has division line and the solid milk has the above strength, it is possible to divide the solid milk in accordance with the divide line.

A preferred embodiment of the solid milk is that the ingredient of the solid milk consists only of powdered milk. The solid milk of the present invention is usually taken by infants or children. Thus it is preferred for the solid milk to be manufactured without adding additives as little as possible. This embodiment of the solid milk can attain solid milk with excellent strength and solubility by producing crystalline lactose at the surface area and make the crystal attached to each other even though no additives are added.

A preferred embodiment of the solid milk is that the solid milk is dissolved in a liquid the volume of the liquid increases 9.5 ml to 10.5 ml (more specifically 10 ml) or 19.5 ml to 20.5 ml (more specifically 20 ml). When someone gives milk to an infant or a child using the solid milk, she usually pours hot water of predetermined amount into a baby bottle, first. Then she adds a piece of or predetermined pieces of solid milk into the hot water to obtain liquid milk that is given to the infant or the child. Contrarily, she may enter the solid milk first into the baby bottle and she might enter wrong number of solid milk when she makes milk for the infant or the child. In such a case, if she takes the solid milk off from the bottle, then the solid milk may suffer contamination. Furthermore, it is troublesome to take solid milk from the baby bottle. Thus the embodiment of the solid milk is configured to increase a predetermined amount when it is dissolved in hot water. Thus even if the solid milk is poured before the hot water is poured into the baby bottle, all she has to do is to pour hot water with considering the amount that increased by the solid milk. Namely, the solid milk is very convenient to deal with.

The second aspect of the present invention is directed to a method for the manufacture of solid milk. The method comprises a step of compressing powdered milk, a step of humidifying the compressed powdered milk and a step of drying the humidified compressed powdered milk. The step of compressing powdered milk is a step for compressing powdered milk so as to obtain solid compressed powdered milk. The step of humidifying the compressed powdered milk is a step for obtaining humidified compressed powdered milk. The step of drying the humidified compressed powdered milk is a step for drying the humidified compressed powdered milk so as to obtain the solid milk. A part of amorphous lactose at the surface of the solid milk 12 is crystallized at the steps of humidifying step and drying. The method of the present invention crystallizes a part of amorphous lactose at the surface area of the compressed powdered milk. Then crystalline lactose attaches each other and forms a hard layer that comprises vacant spaces and thus it is possible to obtain solid milk that has suitable solubility and high strength.

A preferred embodiment of the method for the manufacture of solid milk is that the step of humidifying is a step for keeping the compressed powdered milk under humidity of 60% RH to 100% RH atmosphere for 5 seconds to 1 hour.

Another preferred embodiment of the method for the manufacture of solid milk is that the step of drying is a step for keeping the humidified compressed powdered milk under humidity of 0% RH to 30% RH atmosphere for 0.2 minute to 2 hours. A preferred embodiment of the method for the manufacture of solid milk is that the powdered milk comprises more than 30 wt % of lactose. A preferred embodiment of the method for the manufacture of solid milk is that the powdered milk comprises more than 20 wt % of amorphous lactose. A preferred embodiment of the method for the manufacture of solid milk is that the powdered milk does not contain any crystalline lactose or comprises less than 10 wt % of crystalline lactose. When the ingredient comprises little amount of lactose crystal that forms core to crystallization it becomes possible to make large amount of amorphous lactose to change into crystalline lactose.

A preferred embodiment of the method for the manufacture of solid milk is that the powdered milk comprises 0.5 wt % to 10 wt % of crystalline lactose or the powdered milk comprises powder of crystalline lactose. When the ingredient comprises little amount of crystalline lactose that forms core to crystallization it becomes possible to make large amount of amorphous lactose to change into crystalline lactose.

A preferred embodiment of the method for the manufacture of solid milk is that the powdered milk obtains crystalline lactose by humidifying and drying granules of ingredients of the powdered milk.

A preferred embodiment of the method for the manufacture of solid milk is that the method further comprises a step of cooling the concentrated milk before the step of drying such that the powdered milk obtains crystalline lactose. The step of drying the humidified compressed powdered milk may be a spray dry process.

Technical Effect of the Invention

The present invention changes a part of amorphous lactose that is included in powdered milk and thereby it can provide solid milk that has a preferred solubility and strength and a method of making the same. Further the present invention can provide solid milk that is easy to handle in transportation and easy to measure and method of making the same.

The present invention can obtain solid milk with hard surface only by the steps of humidifying and drying such that it can control composition of solid milk by controlling nutritional component of powdered milk. The present invention can provide a method for manufacturing such solid milk.

Another object of the present invention is to provide a method for manufacturing solid milk that can prevent powdered milk from attaching to trays during the steps of humidifying and drying by changing a part of amorphous lactose that is included in powdered milk. Thus the method for manufacturing solid milk of the present invention is high productivity.

The present invention can provide a method for manufacturing solid milk that can manufacture solid milk after manufacturing powdered milk by making use of the powdered milk.

BRIEF DESCRIPTION OF DRAWINGS

FIG. 2(a) is a powdered X-ray diffraction pattern that shows Standard of α-type monohydrate crystalline lactose (Amount of physical mixed quantity).

FIG. 2(b) is a powdered X-ray diffraction pattern that shows Standard of β-type anhydrate crystalline lactose (Amount of physical mixed quantity).

FIG. 7 is a graph that shows a relationship between the distance from the surface and the comprising ratio of crystalline lactose.

FIG. 8 is a graph that shows effect of attachment with various amount of lactose crystal.

FIG. 9 is a graph that shows effect of type of additives.

FIG. 10 is SEM picture that shows effect of attachment with various amount of crystalline lactose.

BEST MODE FOR CARRYING OUT THE INVENTION

We explain the best mode for carrying out the present invention. The following embodiments are examples and thus the present invention includes various modifications that the skilled person may arrive at.

Figure 1:
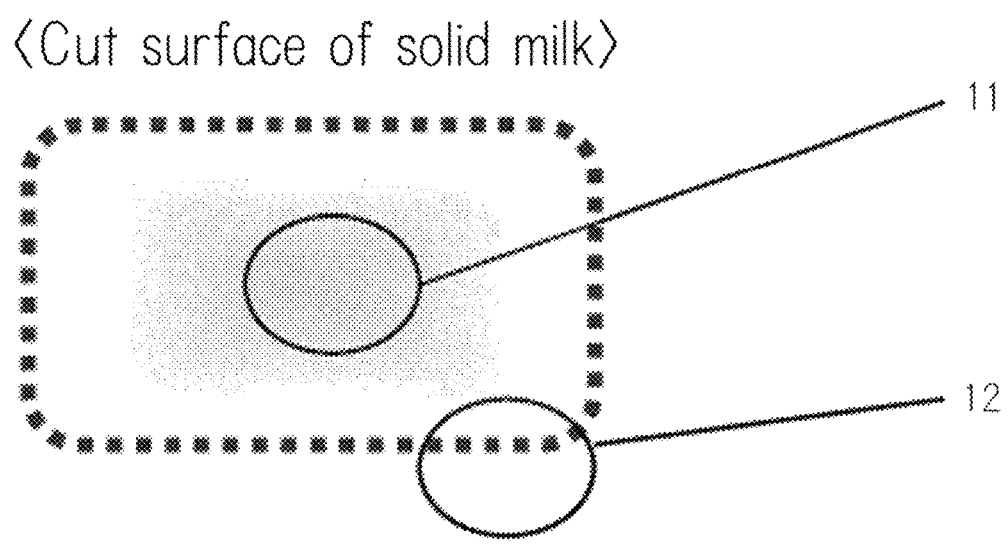
FIG. 1 is a schematic diagram of the cut surface of solid milk.

1. Solid milk FIG. 1 is a schematic diagram of the cut surface of solid milk. Element numeral 11 indicates the central area and element numeral 12 indicates the surface area. The solid milk of the present invention may comprise crystalline lactose at the surface area. The surface 12 of the solid milk has X-ray diffraction pattern that has a main peak of $2\theta=10\text{-}15°$ at $2\theta=10\text{-}11°$ or at $2\theta=12\text{-}13°$. The X-ray diffraction pattern may be obtained by an X-ray Powder Diffraction meter. The peak at the range of $2\theta=10\text{-}11°$ is considered to have relationship with anhydrous crystalline lactose. The peak at the range of $2\theta=12\text{-}13°$ is considered to have relationship with monohydrate crystalline lactose. The main peak of $2\theta=10\text{-}15°$ is at the range of $2\theta=10.25\text{-}10.75°$ or at the range of $2\theta=12.25\text{-}12.75°$.

The preferred embodiment of the solid milk relates to the following solid milk. The Ia is defined as a sum of:

an integrated intensity of a first region of X-ray diffraction pattern of the surface 12 of the solid milk, the center of the first region is a main peak of $2\theta=10\text{-}11°$ of the pattern and the width of the first region is twice of the full width of half maximum of said main peak of $2\theta=10\text{-}11°$; and an integrated intensity of a second region of X-ray diffraction pattern of the surface 12 of the solid milk, the center of the second region is a main peak of $2\theta=12\text{-}13°$ of the pattern and the width of the second region is twice of the full width of half maximum of said main peak of $2\theta=12\text{-}13°$.

The Ib is defined as a sum of:

an integrated intensity of a first region of X-ray diffraction pattern of center area 11 of the solid milk, the center of the first region is a main peak of $2\theta=10\text{-}11°$ of the pattern and the width of the first region is twice of the full width of half maximum of said main peak of $2\theta=10\text{-}11°$; and an integrated intensity of a second region of X-ray diffraction pattern of the center area 11 of the solid milk, the center of the second region is a main peak of $2\theta=12\text{-}13°$ of the pattern and the width of the second region is twice of the full width of half maximum of said main peak of $2\theta=12\text{-}13°$.

The preferred embodiment of the solid milk is that the amount of crystalline lactose at the surface 12 of the solid milk is larger than that of lactose crystals at center area 11 of the solid milk. The lactose crystal includes anhydrous crystalline lactose and monohydrate crystalline lactose. The Ia/Ib of a preferred embodiment of the solid milk is equal to or more than 2.5. The preferred embodiment of the solid milk is that the Ia/Ib is from 2.5 to 15. The other example of Ia/Ib is 3 to 10, and may be 5 to 10. The central area of the solid milk may have no lactose crystal. The solid milk of the present invention has many of the crystalline lactose at its surface area and there is little crystalline lactose at the central area of the solid milk. The feature brings the solid milk of the present invention superior strength and solubility. It is preferred that 10 wt % to 75 wt % of the amorphous lactose at the surface area changed to be lactose crystal. The amount of amorphous lactose and the amount of crystalline lactose may be measured by the method of test example 1 whish is referred hereafter.

The preferred embodiment of the solid milk is that the amount of crystalline lactose at the surface 12 of the solid milk is larger than that of crystalline lactose at center area 11 of the solid milk. More concretely, a preferred embodiment of the solid milk is that wherein the amount of crystalline lactose at the surface 12 of the solid milk is more than 5 wt % larger than that of crystalline lactose at center area 11 of the solid milk. As is shown by the working example, the amount of crystalline lactose at the surface 12 of the solid milk is more than 10 wt %, or more than 20 wt %, or more than 25 wt % larger than that of crystalline lactose at center area 11 of the solid milk. If all of the surface area of the solid milk is crystalline lactose, the solubility of it is not preferable. Thus a preferred embodiment of the solid milk is that t the amount ratio of crystalline lactose and amorphous lactose at the surface 12 of the solid milk is 25:75 to 90:10. More specifically, the example of the amount of crystalline lactose at the surface area of the solid milk is 5 wt % to 50 wt %. The amount may be 10 wt % to 40 wt % and may be 10 wt % to 30 wt %.

Central area of the solid milk does not have to comprise much crystalline lactose. It is preferred for the central area of the solid milk to comprise amorphous lactose. Namely it is preferred for the main compound of the central area not to be amorphous lactose. Thus a preferred embodiment of the solid milk is that the center area 11 of the solid milk does not contain crystalline lactose. The amount rate of crystalline lactose and amorphous lactose at the center area 11 of the solid milk may be less than 90:10, namely the amount ratio of crystalline lactose and amorphous lactose is less than 1/9. More specific amount of crystalline lactose at the central area is 0 wt % to 10 wt % and the amount may be less than 5 wt % and may be less than 4 wt %.

The solid milk of the present invention has crystalline lactose at the surface area. The strength of solid milk increases when the layer that comprises crystalline lactose has thickness more than predetermined value. Thus a preferred embodiment of the solid milk is that the solid milk has 0.2 mm or more (preferably 0.5 mm or more) of a hard layer at the surface 12 of the solid milk. The hard layer of the solid milk may comprise more than 10 wt % of crystalline lactose.

When the solid milk has a hard layer which comprises crystalline lactose more than 0.2 mm, the solid milk has high enough strength. As explained above, the preferred embodiment of the solid milk is that the region that includes the central area is not a hard layer. Thus the examples of the thickness of the hard layer are 0.2 mm to 2 mm and 0.5 mm to 2 mm. The thickness of the hard layer may be 0.3 mm to 1.8 mm, the thickness may be 0.5 mm to 1.8 mm, or the thickness may be 0.7 mm to 1.5 mm.

A preferred embodiment of the solid milk is that the volume of the solid milk is from 1 cm$^3$ to 50 cm$^3$. This solid milk has larger volume than that of powdered milk and it makes easy to calculate suitable amount of the solid milk and it makes solid milk to be convenient to be transported.

A preferred embodiment of the solid milk is that when a force, which is caused by a load, in the direction of short axis of the solid milk causing the solid milk be broken is 30 N to 300 N when the solid milk has a rectangular solid shape. The solid milk of the embodiment has sufficient strength and thus it is possible for the solid milk from being broken in transport. When solid milk has division line and the solid milk has the above strength, it is possible to divide the solid milk in accordance with the divide line.

A preferred embodiment of the solid milk is that the ingredient of the solid milk consists only of powdered milk.

A preferred embodiment of the solid milk is that the solid milk is dissolved in a liquid the volume of the liquid increases 9.5 ml to 10.5 ml (more specifically 10 ml) or 19.5 ml to 20.5 ml (more specifically 20 ml).

In this specification. "solid milk" means a type of milk modified into solid state at normal temperature. The solid milk specifically means powdered milk molded into a predetermined size and weight, which renders, when dissolved in water, the same substance as that of the powdered milk dissolved in water. The example of the solid milk is tablet type (solid state) milk. The solid milk is usually intended to be given by infants after dissolving into hot water. Thus it is better for the solid milk to have similar taste as mother's milk. The solid milk may comprise sugar except for lactose less than 10 wt %, or preferably less than 6 wt %.

In this specification. "crystalline lactose" means monohydrate crystalline lactose and anhydrous crystalline lactose. The examples of crystalline lactose are α-type monohydrate crystalline lactose, α-type anhydrous crystalline lactose, and β type anhydrous crystalline lactose. Usually α-type anhydrous crystalline lactose is not detected from powdered milk and solid milk. Thus crystalline lactose substantially means α-type monohydrate crystalline lactose and β type anhydrous crystalline lactose.

In this specification, "main peak" means the most intense peak within the predetermined range in the X-ray diffraction pattern.

In the specification, "surface area" or surface means that surface planes except for the bottle plane of solid milk or compressed powdered milk. For example when the solid milk has rectangular solid shape, then the surface area means the upper plane and side planes of the solid milk. This is because when steps of humidifying and drying are executed with the solid milk or compressed powdered milk on a tray, it is not easy to humidify or dry the bottle plane.

In the specification, "central area" means the area that comprises the center of gravity of solid milk. In assessing the crystal state of the central area, the region that includes the center of gravity and 20% of upper and lower thickness and 20% of left and right thickness is treated to be the central area. Then the volume of the central area was 1/125 times of the total volume of the solid milk. In executing X-ray scattering analysis of the central area, the solid milk may be cut so that the above region should be exposure or a part of the central point of the solid milk may be removed to analysis. 20% of upper and lower thickness and 20% of left and right thickness mean 20% of height, width and depth.

In the specification, "hard layer" means the layer that comprise more than 10 wt % of crystalline lactose. The hard layer may be formed, e.g., by hardening the surface of the compressed powdered milk through steps of humidifying and drying. The hard layer usually has the feature that it is harder than the compressed powdered milk before it is hardened, is not sticky or has less adhesion, and crystalline lactose therein attached to each other.

In the specification, "A to B" means equal to or more than A and equal to or less than B.

In the specification, "porosity" means a percentage of the volume of interstices accounting for the volume of powder mass (see e.g. "Iyakuhin no Kaihatu (Development of Medicine)" edited by Miyajima Kouichiro (Vol. 15), Hirokawa Shoten 1989, Page 240). More specifically, it is a value measured by "porosity measurement for solid milk" in a test example which will be described later.

In this specification, "powdered milk" means modified milk and the like which is dried and powdered mixture of fat-soluble component such as milk fat and resin and water-soluble component such as water, sugar, protein (including peptide and amino acid), and mineral. Examples of powdered milk include whole milk powder, modified milk powder, creamy powder, and the like.

In this specification, "additive" means an agent or agents such as binder, disintegrant, lubricant, and leaven other than nutritional component.

In this specification, "substantially no additive is added" means to use basically only the powdered milk as the basic ingredient, where the additive is equal to or less that 0.5% by weight (preferably 0.1% by weight or less) that is the amount that the additive has no effect on the nutritional component. It is to be noted that in the present invention, it is preferable that only the powdered milk is used as the basic ingredient and that no additive other than the powdered milk is used.

It is preferred for the solid milk of the present invention to have the hard layer that comprises crystalline lactose and the crystalline lactose attaches to each other and form a net shaped hard layer. Thereby, it is possible for the solid milk of the present invention to attain suitable strength. The present invention makes crystalline lactose to exist on the surface of the solid milk such that the solubility as well as the strength of the solid milk increases. Further, when the solid milk is dissolved, hot water may enter into the holes or vacant space, which may be a net shaped, quickly. Thus the solid milk has a high solubility. The hard layer at the surface area of the solid milk of the present invention lessen the surface tack or adhesiveness of solid milk and thus the solid milk is easy to handle in retaining the solid milk and in transporting the solid milk.

The hard layer comprises net shaped crystalline lactose in which crystalline lactose attached to other part of crystalline lactose. The crystalline lactose with connected net shape is formed when the surface area of solid milk or compressed milk is humidified and dried under the predetermined condition. Then the amorphous of lactose near the surface area of the solid milk bridges and crystallized. In other word, even if crystalline lactose would be added to powdered milk, it is impossible to obtain net shaped crystalline lactose. The present invention can obtain net shaped lactose crystal is the following steps. Powdered milk is compressed. Next, dissolve amorphous lactose that exists close to the surface of solid milk. Then the compressed powdered milk is dried such that the amorphous lactose is crystallized with the amorphous lactose attached to each other and crystalline lactose is attached to each other. When amorphous lactose comprises little amount of crystalline lactose, the crystal acts as a core of crystallization, it is possible to accelerate the crystallization of the amorphous lactose. Thus it is possible for the solid milk of the present invention to control the crystallization of the amorphous lactose by adding predetermined amount of crystalline lactose into powdered milk which is an ingredient and to obtain suitable surface conditions. The suitable surface conditions include it has thick hard layer, has a lot of minute holes, and has less adhesiveness.

It is possible for the solid milk of the present invention to have one or a plurality of hard layers at predetermined places. For example, it is possible to make only peripheral region of one specific plane of the solid milk to be a hard layer. It is possible to make only peripheral region of one specific side of the solid milk to be a hard layer. It is possible to make only peripheral region of one specific vertex of the solid milk to be a hard layer. The shape of the hard layer may be lattice shape or checker-board shape.

A preferred embodiment of the solid milk of the present invention has a lot of vacant spaces or holes. A picture of SEM, scanning electron microscope, of the cut surface of the solid milk of the present invention shows that a hard layer is observed at the surface area to be shell like shape and powdered milk is observed to have walnut shape within the hard layer. Further, plenty of minute vacant spaces and holes in the hard layer are observed and relatively large vacant spaces and holes are observed within the hard layer. When the surface of the solid milk is observed by SEM, concaves and convexes are observed as if islands on the sea and plenty of vacant spaces and holes are observed. The preferred color of the solid milk is white or blight yellow. The preferred solid milk has no fume or has little smell.

The solid milk of the present invention has porosity of 30%-50% (between 30% and 50% inclusive). As the porosity increases the solubility increases but the strength decreases. Also, when the porosity is small, the solubility is low. The porosity is mainly controlled by the compression force in the compression process. It is to be noted that in the present invention, while the porosity may be 35% to 50%, the porosity may be adjusted to 30% to 35%. 30% to 45%, 40% to 45%, or 40% to 50%, according to its intended purpose. By adjusting the porosity to be within these ranges, it is made possible to obtain favorable solid milk having resolved the problems of an oil off and the like as will be described later.

It is preferable that plurality of interstices (vacant spaces or holes) exist in solid milk. The interstices (hollows) are preferably distributed evenly. Since the interstices are distributed almost evenly in the solid milk, higher solubility can be obtained. The larger the interstice, the easier the water can penetrate, so that fast solubility can be obtained. On the other hand, when the size of the interstice is too big, the strength is decreased or the surface of the solid milk becomes rough. Therefore, the example of the size of the interstice is 10 µm to 500 µm and preferred size is 50 µm to 300 µm. This size of the interstice can be measured with known means, such as an examination of the surface and the cross-section plane of the solid milk by using a scanning electron microscope.

The components of the solid milk is basically the same as those of the powdered milk which is the basic ingredient excluding the amount of water. The examples of components of the solid milk are sugar, protein, mineral, and water. The example of the fat content in the solid milk is 5% to 70% by weight, the preferable fat content is 5% to 50% by weigh, and more preferable fat content is 10% to 45% by weight.

The solid milk of the present inventions may include the emulsified fat and the free fat as the fat. Namely, in the conventional powdered milk and the solid milk, the free fat has been proactively excluded due to the problems of degrading flavor and floating on water (oil off) when dissolved in hot water. Preferably, the solid milk of the present invention proactively includes this free fat for an effective use as substitute for the lubricant and the like. Thus, the present invention can produce good solid milk without using additives. However, too much free fat may result in problem of the oil off. Therefore, the example of the free fat content in the solid milk of the present invention is 0.5% to 4% by weight, preferable free fat content is 0.7% to 3% by weight, and more preferable free fat content is 1% to 2.5% by weight. This is because a preferable strength, solubility, and excessive oil off can be controlled as shown in the embodiments which will be described later. It is to be noted that the amount of free fat where the oil off will become problematic depends on the physicality such as the fat composition and the spherical form of fat within the powdered milk used as the basic ingredient, so that the amount of the free fat included in the solid milk may be appropriately adjusted within the above-mentioned ranges.

When there is much water contained in the solid milk, the storage stability degrades while scarce water makes the solid milk fragile. Therefore, the example of water content in the solid milk of the present invention is 1% to 4% by weight, and preferable water content is 2% to 3.5% by weight.

The shape of the solid milk of the present invention is not specifically limited as long as the solid milk has a certain size. The examples of the shape of the solid milk are column-shaped, elliptical column-shaped, cubic-shaped, rectangular parallelepiped-shaped, plate-shaped, sphere-shaped, polygonal column-shaped, polygonal pyramid-shaped, frustum of pyramid-shaped, and polyhedron. The column-shaped or quadrangular prism-shaped is preferable from the viewpoint of portability convenience. In order to avoid situation that the solid milk breaks, the corners are preferably chamfered.

The solid milk of the present invention preferably makes a quantity of milk to be drunk at one time when one to several particles of solid milk (preferably one particle of solid milk) are dissolved in hot water. Therefore, the example of the volume of the solid milk is 1 $cm^3$ to 50 $cm^3$, the preferable volume is 2 $cm^3$ to 30 $cm^3$, and more preferable volume is 4 $cm^3$ to 20 $cm^3$.

The solid milk of the present invention needs to have a certain level of solubility. The example of solubility for the solid milk of the present invention is less than 10 g or non dissolved remaining under the measurement condition of solubility which will be described later, and preferably less than 8 g and more preferably less than 4 g.

The solid milk of the present invention needs to have a high strength in order to avoid as much as possible situation where the solid milk breaks while being transported. For the solid milk of the present invention under the measurement condition of strength which will be described later, one having strength of 40 N or more is preferable.

More preferred embodiment of the solid milk has 50 N or more of strength. On the other hand, from the perspective of solubility, strength of 300 N or less is preferable.

It is preferred for the solid milk of the present invention to have adhesion ability less than 10 N so as to avoid solid milk sticking to a tray after steps of humidifying and drying and so as to easily be removed even if the solid milk were to attach to a tray. By lessening adhesion ability of solid milk, it is possible to lessen trouble in manufacturing and can enhance productivity per unit time.

2. Manufacturing Process

The method for manufacturing a solid milk of the present invention includes a compression step, a humidifying step and a drying step. The compression step is a step for compressing powdered milk to obtain a solid form of compressed powdered milk. The humidifying step is a step for humidifying the compressed powdered milk obtained by the compression step. The drying step is a step for drying the compressed powdered milk humidified by the humidifying step. The humidifying step and the drying step make a part of the surface portion of the compressed powdered milk to be crystallized.

2.1 Compression Step

The compression step is a step for compressing a powdered milk to obtain solid form of compressed powdered milk. In the compression step, the powdered milk is compressed with relatively low pressure to the extent that the powdered milk can be moved over to the next step. The compressed powdered milk has vacant space or interstices for water to enter the compressed milk. In the compression step, the powdered milk is compressed in order to fulfill the requirements that compressed powdered milk has appropriate interstices and can keep or retain its shape. The porosity of the compressed powdered milk in this compression step is closely related to the porosity of the solid milk. Further, if the lubrication of the compressed powdered milk is scarce, the compressed powdered milk may attach to the apparatus such as a tablet machine. Moreover, if the compressed powdered milk has week shape keeping ability, the solid milk than cannot keep good shape sometimes be produced.

For the basic ingredient of the compression process, preferably only powdered milk is used and no additive is preferably and substantially added. The powdered milk may be purchased commercially or the powdered milk may be produced by the known producing method (such as the producing method disclosed in, e, g., Japanese Patent Application Laid-Open Publication Nos. HEI10-262553, HEI11-178506, 2000-41576, 2001-128615, 2003-180244, and 2003-245039). The composition of the powdered milk may be similar to that of the above-mentioned solid milk. It is to be noted that as the basic ingredient in the compression process, fat may be added. However, if the fat is added, the fat may cause the oil off trouble. Further, the added fat sticks to the surface of the powdered milk. It decreases the precision of filling to the mortar. Therefore, in the compression stage, the powdered milk which is made to include a target free fat content is preferably used.

When the fat content in the powdered milk is large, the small compression force may be sufficient. On the other hand, when the fat content in the powdered milk is small, large compression force may be required. Therefore, the use of powdered milk with more fat content satisfies the requirement for providing appropriate interstices and producing compressed powdered milk with shape retaining attribute. From such viewpoints, the example of the fat content in the powdered milk is 5 wt % to 70 wt %, preferably 5 wt % to 50 wt %, and more preferably 10 wt % to 45 wt %.

As described above, the powdered milk which includes free fat is preferable. In the present invention, this free fat is effectively used instead of lubricant or the like. Accordingly, the present invention can produce good solid milk without adding additives. The example of free fat content in the solid milk of the present invention is 0.5 wt % to 3 wt %, preferably is 0.7 wt % to 2.4 wt %, and more preferably is 1 wt % to 2 wt %.

When large amount of water is included in the powdered milk, the solid milk has poor storage stability. When the amount of the water is small, the solid milk becomes fragile or brittle (the solid milk has poor the shape retention ability). Therefore, the example of the content of water in the solid milk is 1 wt % to 4 wt %, preferably is 2 wt % to 3.5 wt %.

In the compression process, the compressed powdered milk is produced by compression means for compressing the powdered milk to obtain compressed powdered milk of the solid state. The compression means is not specifically limited as long as being capable of compressing the powdered milk to obtain the compressed powdered milk of the solid state. The examples of the compression means are a tablet machine such as a known tablet machine and a compression test apparatus. Within the apparatus, the tablet machine is preferred. It is to be noted that the examples of the tablet machines are described in Japanese Examined Patent Application Publication No. SHO33-9237, Japanese Patent Application Laid-Open Publication No. SHO53-59066, Japanese Patent Application Laid-Open Publication Nos. HEI6-218028, 2000-95674, and Japanese Patent No. 2650493.

It is to be noted that when using the tablet machine to compress powdered object, for example, the powdered object is put in a mortar, pound with a pestle to add compression force to the powdered object, and made into solid state. If the powdered object has scarce lubricity, the situation may occur where the powdered object sticks to the surface of the pestle. This will not only degrade the quality of the product but will require cleaning of the surface of the pestle, resulting in the decrease of the process yield. Therefore, addition of lubricant is performed especially in manufacturing medicine. However, the lubricant is wax that is not very soluble in water. Therefore, it is undesirable to add lubricant to such thing as the solid milk that is for drinking in a state dissolved in hot water. This is one of the reasons why the manufacturing of the solid milk has been difficult. The present invention, as described above, uses as the lubricant an adequate amount of the free fat that has been regarded as desirable not to be generated, thereby preventing the situation where the powdered milk sticks to the pestle. Moreover, as described above, by obtaining the powdered milk compressed having an appropriate porosity, it is made possible to obtain solid milk with an excellent shape retaining attribute, Also, while the addition of disintegrant may cause a situation where sediment is generated, with the method for making the solid milk of the present invention, the disintegrant is unnecessary, so that such situation can be effectively avoided.

The environmental temperature in the compression process is not specifically limited. The compression process can be performed at the room temperature. More specifically, the example of for the environmental temperature in the compression process is 10° C. to 30° C. The example of humidity in the compression process is 30% RH to 50% RH. It is preferable in the compression process that the compression of the powdered milk is performed continuously.

2.2. Humidification Process

Humidification process is a step of humidifying compressed powdered milk obtained at the step of compressing powdered milk. In the process, the compressed powdered milk is put on a tray and is exposure under humidity 60% RH to 100% RH for 5 seconds to 1 hour. Humidifying compressed powdered milk makes granules at the surface of the compressed powdered milk, especially a part of amorphous lactose, to be dissolved and to bring cross linking reactions. Because humidity will not reach inner portion of the compressed powdered milk, the technical effect of adding humidity is limited to the surface of the compressed powdered milk. Namely, at the surface area, a part of amorphous lactose dissolves. Contrarily, amorphous lactose at the central area hardly or rarely dissolves. Thus the difference makes surface area and central area different.

In the humidifying process, it is possible to humidify the compressed powdered milk by the humidifying means for humidifying the compressed powdered milk. The example of the humidifying means includes known humidifying means such as high humidity chamber, spray, and steam. Also, the example of humidifying method is one of the known humidifying methods that include placing the object under high humidity condition, misting the object with water by a spray, and spraying steam on the object can be adopted. The examples of the humidity in the high humidity environment is 60% RH to 100% RH, preferably is 80% RH to 100% RH, and more preferably 90% RH to 100% RH. Further, the examples of time duration to place the object under the high humidity environment is 5 seconds to 1 hour, preferably is 10 seconds to 20 minutes, and more preferably is 15 seconds to 15 minutes. The example of the temperature in the method of placing the object under high humidity environment is 30° C. to 100° C., and preferably is 40° C.-80° C. The humidifying time duration may be appropriately adjusted according to the humidity, temperature, the required physicality of the solid milk, and the like. When the solid milk has cubit shape the side length of which is more than 1 cm and when the volume of the solid milk is 1 cm$^3$ to 50 cm$^3$, the preferred condition may be 60% RH to 100% RH, 5 seconds to 1 hour and 30° C. to 100° C.

The amount of water added (hereinafter, also referred to as "humidifying amount") to the compressed powdered milk in the humidifying process may be appropriately adjusted. However, in the present invention, since only the powdered milk is basically used as the basic ingredient, as indicated by the embodiment (embodiment 5) and FIG. 3 that will be described later, the following range is preferable as the humidifying amount. Namely, while the humidifying amount of 0.5% increases the strength, the humidifying amount of 1% almost doubles the strength. Thus, the strength tends to increase as the humidifying amount increases. On the other hand, the increase of the strength stops with the humidifying amount of 2.5% or more. Also, when the humidifying amount exceeds 3%, the compressed powdered milk dissolves, becomes deformed, or sticks to the apparatus during transfer. Accordingly, for the amount of water added to the compressed powdered milk, 0.5% to 3% of the mass of the compressed powdered milk is preferable, while 1% to 2.5% is more preferable.

2.3. Drying Process

The drying process is a step of drying powdered milk that has been humidified at the humidification process on a tray, for example. The drying process makes humidified compressed powdered milk to be dried. At that time, when dissolved amorphous lactose near the surface area dries it become crystalline. By controlling the condition of drying it is possible to obtain a hard layer that was formed by crystalline lactose attached each other in a manner that forms net shape. It makes the strength of surface area of the compressed powdered milk increased.

The hard layer manufactured the above has plenty of vacant spaces (holes) conformed by the net shaped crystalline lactose. Thus when the solid milk is dissolved in hot water, the hot water enters into the vacant space (hole) and it brings favorable quick dissolubility. The manufacturing method of the present invention can make it possible to manufacture solid milk that has high strength and favorable solubility. Further, when solid milk comprises a hard layer with crystalline lactose at its surface, it is possible to lessen surface tack or lessen stickiness. It leads the solid milk be retained as a product easily and be handled easily, for example when it is transported. Previously, there existed solid milk that was attached to a tray after drying step was over. The method of manufacturing solid milk of the present invention prevents such situation from happening and even if solid milk were to attach to a tray it would be easy to remove it.

At the drying process it is possible to apply conventional method even if the method can dry the compressed powdered milk humidified at the humidifying process. The examples of the method are, putting the target under low humidity and high temperature circumstance and attaching dried air or high temperature dried to the target.

For the "humidity" in the method for placing the object under environment of low humidity and high temperature. 0% RH to 30% RH, preferable humidity is 0% RH to 25% RH, and more preferable humidity is 0% RH to 20% RH. Thus, it is preferable to set the humidity as low as possible. For the "temperature" in the method for placing the object under an environment of low humidity and high temperature, and the example of the high temperature is 20° C. to 150° C., preferable temperature is 30° C. to 100° C., and more preferable temperature is 40° C. to 80° C. For the "drying time" in the method for placing the object under environment of low humidity and high temperature, the example is 0.2 min to 2 hours, preferable example is 0.5 min to 1 hour, and more preferable example is 1 minute to 30 minutes.

As described above, if much water is included in the solid milk, the shelf life is degraded, while if the water is less it becomes fragile. Therefore, in the drying process, it is preferable to control the water content in the solid milk to be within 1% below and above (preferably within 0.5% below and above) the water content in the powdered milk used as the basic ingredient by controlling the conditions such as drying temperature and drying time.

The humidifying step and the drying step can make a part of amorphous lactose around the surface of the compressed powdered milk to become crystalline. By crystallizing a part of amorphous lactose though the humidifying step and the drying step, rather than just adding crystalline lactose to powdered milk, it becomes possible to attain high strength by binding crystalline lactose each other to form uniformed crystal. Because the compressed powdered milk comprises powdered milk that has large amount of amorphous lactose inside, it is possible to keep favorable solubility by making use of vacant spaces and holed of compressed powdered milk. Thus it is possible to obtain solid milk that has high strength and favorable solubility.

It is preferred for the powdered milk, which is used as ingredient, to comprise more than 30 wt % of lactose. The more preferred amount of lactose is 40 wt/o %. It is preferred for the powdered milk to comprise more than 20 wt % of amorphous lactose. The more preferred amount of lactose is 30 wt % or more and further preferred amount is 40 wt % or more. When powdered milk comprise less than 30 wt % of lactose or less than 20 wt % of amorphous lactose, little amorphous lactose dissolves though the humidifying step and the drying step. Then the thickness of the hard layer, which is formed after the drying step, is not sufficient and the obtained solid milk might not have enough strength.

It is preferred for the powdered milk, which is ingredient, to comprise 0.5 to 10 wt % of crystalline lactose. The small amount of crystalline lactose mixed in the powdered milk acts as cores for crystallization and it promote crystallization of amorphous lactose. Then the number of minute holes at the surface of the solid milk increases and it becomes possible to reduce adhesives. When powdered milk comprise less than 0.5 wt % of crystalline lactose, a hard layer that has enough thickness is difficult to obtain because the amount of core for crystallization is not sufficient. When the powdered milk comprises more than 10 wt % of crystalline lactose, the solubility of solid milk may not sufficient because the powdered milk has too much crystalline lactose.

The examples of method for mixing crystalline lactose into powdered milk, which is ingredient, are:

(1) adding crystalline lactose into powdered milk;
(2) humidifying and drying granules of powdered milk so that crystalline lactose becomes mixed in powdered milk;
(3) Cooling concentrated milk before spray dry step, which is a one step within manufacturing steps of powdered milk, so that crystalline lactose becomes mixed in powdered milk.

Preferred amount of lactose crystal in the method of (1) and (2), it is preferred that 0.5 to 2 wt % of crystalline lactose is mixed, and in the method of (3), it is preferred that 0.5 to 10 wt % of crystalline lactose is mixed. The difference or non-uniformity of the surface of granules of crystalline lactose brings the difference among methods.

It is possible to select solid milk of the present invention, by analyzing the amount of crystalline lactose at the surface such that only solid milk that comprises predetermined amount of crystalline lactose is selected to be a final product.

3. Method of Making Powdered Milk and Solid Milk

The method of making the powdered milk and the solid milk of the present invention includes a process of making powdered milk, and a process of making solid milk by using the powdered milk as the basic ingredient. It is to be noted that a part of the powdered milk made in the process of making powdered milk may be used as powdered milk to be filled directly in a container. Thus, the powdered milk and the solid milk can be obtained.

3.1 Method of Making Powdered Milk

Details of the manufacturing process of the powdered milk differ depending on the types of the manufactured articles such as powdered skimmed milk, modified milk represented by powdered milk for infants. Basically however, the powdered milk can be made by the process of "basic ingredient (adjustment)→clarification→sterilization-→concentration→(homogenization)→spray drying→sieving→filling". It is to be noted that the size of the powdered milk after spray drying assumes about 5 μm to 150 μm, and the size of the granulated substance of the powdered milk assumes about 100 μm to 500 μm. Also, in the state where the powdered milk and its granulated substance are mixed, the interstice assumes about 5 μm to 150 μm.

The example of the basic ingredient of the powdered milk is milk. For the milk, the example of milk is bovine milk, and more specifically, milk of a cow (Holstein, Jersey, etc.), a goat, a ewe, a buffalo, and the like. The fat content can be adjusted by removing a part of fat from the milk by the method of centrifugal separation or the like. Also, the following nutritional components can be added. On the other hand, when making modified powdered milk, the following nutritional components are added to the water and mixed to be used.

The powdered milk can be made by the processing the above-mentioned liquid as the ingredient by the known manufacturing method including processes of "clarification", "sterilization", "concentration", "spray drying", "sieving", and "filling".

For the protein as the basic ingredient of the powdered milk, milk protein and milk protein fraction such as casein, milk serum protein (α-lactalbumin, β-lactoglobulin, and the like), milk serum protein concentrate (WPC), milk serum protein isolate (WPI); animal protein such as egg protein; plant protein such as soy protein and wheat protein; peptide having the foregoing protein decomposed into variety of chain lengths by enzyme or the like, amino acid such as taurine, cystine, cysteine, arginine, and glutamine may be used alone or by mixture.

For the fat as the basic ingredient of the powdered milk, animal oil and fat such as milk fat, lard, beef fat, fish oil; vegetable oil such as soy oil, canola oil, corn oil, coconut oil, palm oil, palm kernel oil, safflower oil, cottonseed oil, linseed oil, and MCT; or fractional oil, hydrogenated oil, or ester exchanged oil of the foregoing oil may be used alone or by mixture.

For the carbohydrate as the basic ingredient of the powdered milk, lactin, simple sugar, glucose, malt sugar, oligosaccharide such as galacto-oligosaccharide, fructo-oligosaccharide, lactulose, polysaccharide such as farina, soluble polysaccharide, and dextrin, or artificial sweetener may be used alone or by mixture. In addition, vitamin group, mineral group, aroma chemical, flavoring substance, or the like may be added as the basic ingredient of the powdered milk.

3.1.1. Clarification Process

The clarification step is for removing microscopic foreign substance included in cow milk or the like by known means such as centrifugal separator, filter, or the like.

3.1.2. Sterilization Process

The sterilization process is for deadening microbe such as bacteria included in cow milk or the like. The deadening temperature and holding time in the sterilization process vary depending on the types of the powdered milk, and conditions related to the known sterilization can be adopted.

3.1.3. Concentration Process

The concentration process is an arbitrary process for preparatory concentrating milk or the like before the spray drying process which will be described later, and known means such as vacuum evaporative can and conditions can be adopted.

3.1.4. Homogenization Process

The homogenization process is an arbitrary process for homogenizing the size of solid component such as fat globule distributed within cow milk or the like to fixed size, and known means and conditions for applying high pressure to the processed liquid so as to pass the processed liquid through a narrow gap.

3.1.5. Spray Drying Process

The spray drying process is for obtaining fine particles by evaporating the water within the concentrated milk. A known means such as spray dryer and known condition can be adopted.

3.1.6. Sieving Process

The sieving process is for removing particles whose diameter is large such as hard-packed powder by passing the fine particles obtained by the spray drying process through sieves for particle size regulation.

3.1.7. Filling Process

The filling process is for filling the powdered milk in bags, cans, and the like. For the method of making the powdered milk and the solid milk of the present invention, the above-mentioned method of making solid milk may be adopted after making the powdered milk as mentioned above. Namely, the above-mentioned compression process may be performed using the powdered milk having passed through the above-mentioned sieving process as the basic ingredient.

4. Usage of Solid Milk

The solid milk of the present invention is generally dissolved in hot water for drinking. More specifically, after pouring hot water in a covered container, particles of the solid milk of the present invention as required are put in. Then, preferably the container is lightly shaken in order to quickly dissolve the solid milk for drinking in the state of appropriate temperature.

While embodiments are shown hereinafter and the feature of the present invention will be described, the present invention is not limited to these embodiments. In the following description, methods for evaluating items to be evaluated in the embodiments will be described before describing reference examples and embodiments.

Test Example 1 (Amount of Lactose Crystal and Amorphous Lactose)

1. Quantitative Analysis of Total Lactose in a Sample

Quantitative analysis of total lactose in a sample was executed by means of High Performance Liquid Chromatography. Column (Shodex NH2P-20 inner diameter: 4 mm, length: 250 mm) was used. The phases were separated using 75% Acetonitrile (flow rate: 1 mL/min) as moving phase. Differential refractometer was used to detect targets. We calculated total amount of lactose in a sample by a comparison of the peak area of sample solution and lactose in aqueous solution of known concentration of lactose.

2. Quantitative Analysis of Lactose Crystal in Sample 2-1. Preparation of Standard (the Physical Mixture of Known Amount of Lactose Crystal and Powdered Milk)

Milk powder with no crystal and α-monohydrate crystalline lactose (manufactured by Wako Pure Chemical Industries, special grade) or β-anhydrous crystalline lactose (SIGMA-made, 99%) was picked into stainless steel beaker with the amount indicated in the Table 1. The powdered ingredients were well mixed by means of spatula with a care so as not to grain powder. The mixture was passed through a 16 mesh sieve (mesh: 1000 micron openings). The mesh treatment was repeated 10 times so that the mixture has uniform scale and standard 5, 10, 20, 40% of crystalline lactose (Physically mixed) was obtained. We confirmed that no α-anhydrous crystalline lactose was detected from powdered milk and solid milk.

TABLE 1

| Amount of crystalline lactose [wt %] | α-type monohydrate crystalline lactose | | β-type anhydrate crystalline lactose | |
|---|---|---|---|---|
| | Lactose [g] | Powdered milk [g] | Lactose [g] | Powdered milk [g] |
| 5 | 2.5 | 47.5 | 2.5 | 47.5 |
| 10 | 5 | 45 | 5 | 45 |
| 20 | 10 | 40 | 10 | 40 |
| 40 | 20 | 30 | 20 | 30 |

2-2. X-Ray Powder Diffraction

X-ray powder diffraction apparatus (XRD-type manufactured by Shimadzu Corporation 6100) was used for X-ray powder diffraction analysis. We took standard powder and sample powder by an aluminum plate (diameter 25 mm, depth of 1 mm) and we attached them to the sample holder. We obtained X-ray diffraction pattern by using X-ray source (Cu tube, Cu Kα line, 40 kV-30 mA, using Curved graphite Monochromator). We directly attach solid milk to the sample holder and we analyzed it. As a typical measurement conditions were the scanning conditions (two consecutive scans/min, 0.02° step, the scanning angle of 5 to 40°), and slit conditions (Divergence slit: 1°, Scatter slit: 1°, Receiving slit: 0.3 mm).

2-3. Analysis of Diffraction Peak

FIGS. 2(a) and 2(b) show diffraction pattern of standard crystalline lactose (a type monohydrate crystalline lactose and β type anhydrous crystalline lactose). In the diffraction pattern, regarding the peak of $2\theta=12.5°$ (which derives from a type monohydrate crystalline lactose) and the peak of $2\theta=10.5°$ (which derives from β anhydrous lactose crystal), we executed smoothing and deducted base or back ground components and then we calculate the integrated intensity obtained in the region the width of which is twice of half width of full maximum of the peak. Using the ratio of the integral intensity of standard and that of samples, we calculated the amount of a type monohydrate crystalline lactose and β type anhydrous crystalline lactose in a sample. The integral intensity is based on the integral of areas under each peak. To compare the ratio roughly, it is possible to use the height of peaks. Because the widths of peaks are almost uniform, the ratio of peak heights is almost the same as the ratio of integrated intensities of two peaks.

3. Quantitative Analysis of Amorphous Lactose in a Sample

We calculated amorphous lactose in a sample in the following equation.

"Amorphous lactose in a sample"=total lactose−crystalline lactose(α type monohydrate crystalline lactose and β type anhydrous crystalline lactose)

Test Example 2 (Evaluation of Strength)

We calculated strength of solid milk and compressed powdered milk, which is pre-hardened solid milk, by means of the load cell type tablet strength tester manufactured by Okada Seiko Co. We prepared rectangular solid shape of solid milk and compressed powdered milk and made the fracture pin (width 1 mm) of the strength tester push them at constant speed of 0.5 mm/s in a direction of short axis of the rectangular solid. The strength was measured as load [N] when solid milk or compressed powdered milk broken. We regarded strength (tablet strength) [N] of solid milk and compressed powdered milk as the obtained load [N].

Test Example 3 (Evaluation of Solubility)

Quantitative analysis for solubility of solid milk was executed. Two pieces of solid milk (11.2 g) were poured into a baby bottle. Then 80 g (80 mL) of hot water (test solution) was poured into the baby bottle to obtain liquid with 14 wt % of concentration of solute and kept the liquid in calm for 10 seconds. Then, we boiled the liquid for 5 second with rotating the baby bottle relatively mildly by hand so that the trajectory of the baby bottle became a circle (4 revolutions per second). After 5 seconds passed, all of the contents in the babbly bottle were poured onto the mess, the weight of which had already known. The 32 mesh with openings of 500 μm was used. We measured the weight [g] of non-dissolved remaining, which was not dissolved by the hot water, on the mesh. First we wiped out the surface of the non-dissolved remaining and the surface of the mess with care so that the non-dissolved remaining on the mesh would not drop out from the mess. Next we measured the total weight of mesh and non-dissolved remaining. Then we calculated the difference between the total weight and the weight of the mesh to obtain the weight of the non-dissolved remaining on the mesh. Based on the test method, when the weight of the non-dissolved remaining is light then the solid milk has an excellent solubility.

Test Example 4 (Porosity Measurement for Solid Milk)

We measured the porosity of solid milk based on the following equation.

Porosity (%)=(1−$W/PV$)×100

In the above equation, W means the weight of solid milk or compressed powdered milk (g). P means the density of solid milk or compressed powdered milk measured using Beckmann pneumatic density meter (g/cm$^3$), and V means the volume [cm$^3$] of the solid milk or compressed powdered milk calculated by the thickness measured by a micro meter and the shape (width and depth) of mold (mortar).

Test Example 5 (Evaluation of Adhesive)

Immediately after humidifying and drying solid milk on a tray, we evaluated the force required to remove the solid milk from the tray by means of Digital Force Gage (FGP-5) manufactured by Nihon Densan Shimpo.

Reference Example 1 (Making Powdered Milk)

The various powdered milk including various components as shown in table 2 were prepared from the mixture of liquid with fat, sugar, protein, milk, and mineral group added to water and executed homogenization, concentration (evaporation), and spray drying in this order.

TABLE 2

| Composition | Powdered milk 1 | Powdered milk 2 |
| --- | --- | --- |
| Protein [wt %] | 15 | 12 |
| Fat [wt %] | 18 | 26 |
| Sugar [wt %] | 60 | 57 |
| Lactose in suger [wt %] | 43 | 51 |
| Ash [wt %] | 4 | 2 |
| Water, other [wt %] | 3 | 3 |

Reference Example 2 (Manufacturing of Solid Milk)

In the step of humidifying compressed powdered milk, we used Combi Oven, "FCCM6", manufactured by Fujimak Corporation as a humidifier. We maintained the temperature within the humidifier to be 65° C. and humidity of 100% RH. We kept the compressed powdered milk for 45 seconds (humidifying duration) under the condition. In the step of drying the humidified compressed powdered milk, we used an air thermostat "DK600" manufactured by Yamato Scientific Co., Ltd as a drying machine. In the step we dried the humidified compressed powdered milk for 5 second under 95° C. and humidity of 10% RH. Finally, we obtained solid milk.

Example 1

(Technical Effect of Amorphous Lactose in Powdered Milk, Ingredient)

Figure 3:
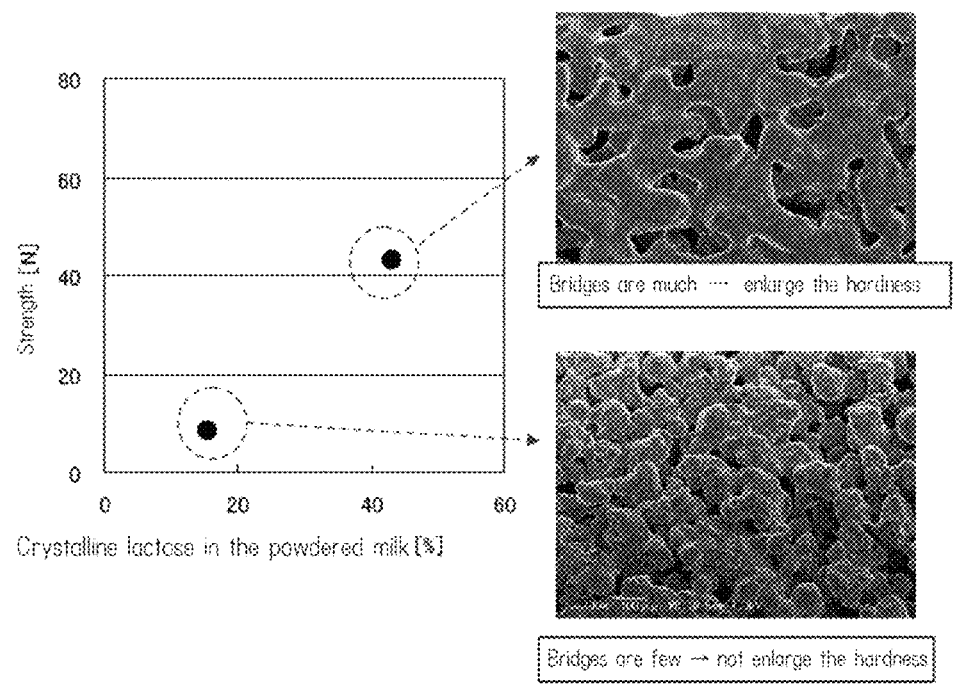
FIG. 3 is SEM picture that shows the influence of the amount of amorphous lactose in solid milk.

We manufactured several solid milks that have different amount of amorphous lactose that has composition of powdered milk 1 (total lactose 43%). These solid milks had almost the same porosity. The strength of solid milk with 15.5% amorphous lactose was as low as 8 N, and that of solid milk with 43.0% amorphous lactose was 43 N (table 3). The result of investigation by scanning electro micrometer, SEM, shows that both solid milks have different amount of bridging among granules. Generally speaking amorphous has higher solubility than that of crystalline. We estimate that steam made amorphous lactose at the surface of the compressed powdered milk dissolved once. Then the dissolved granules attached each other to form bridges to enlarge the strength of the solid milk. It shows that, in case of solid milk that has high porosity to have high solubility, when the ingredient, powdered milk, comprises amorphous lactose obtained solid milk has high strength (FIG. 3).

TABLE 3

| Powdered milk | | Solid milk | | | |
| --- | --- | --- | --- | --- | --- |
| Amorphous lactose [wt] | Crystalline lactose [wt] | Porosity [%] | Strength [N] | Dissolved residue [g] | Increased amount of crystalline lactose [wt] |
| 43 | 0 | 46.3 | 43 | 7 | 7.7 |
| 15.5 | 27.5 | 47.9 | 8 | 6.4 | 0 |

Example 2

(Hardening by the Existence of Crystalline lactose: Surface Reforming and Increase Strength)

Figure 4:
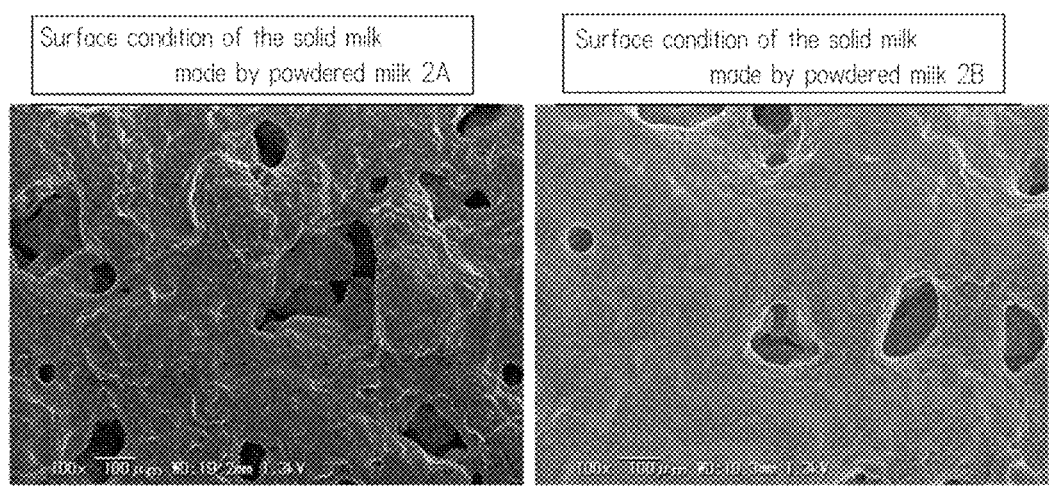
FIG. 4 is SEM picture that shows the influence of the amount of crystalline lactose in solid milk.

We manufactured solid milks that have composition of powdered milk 2 (total lactose 51%) using powdered milk 2A and 2B that have different amount of crystalline lactose (table 4). During a step of preparing the powdered milk, crystalline lactose precipitated. These solid milks had almost the same porosity. The strength of solid milks and evaluated value of attaching ability (adhesiveness) were different drastically. These solid milks had different amount of crystalline lactose at their surface. The surface conditions of these solid milks investigated by SEM were also different (FIG. 4).

Figure 5:
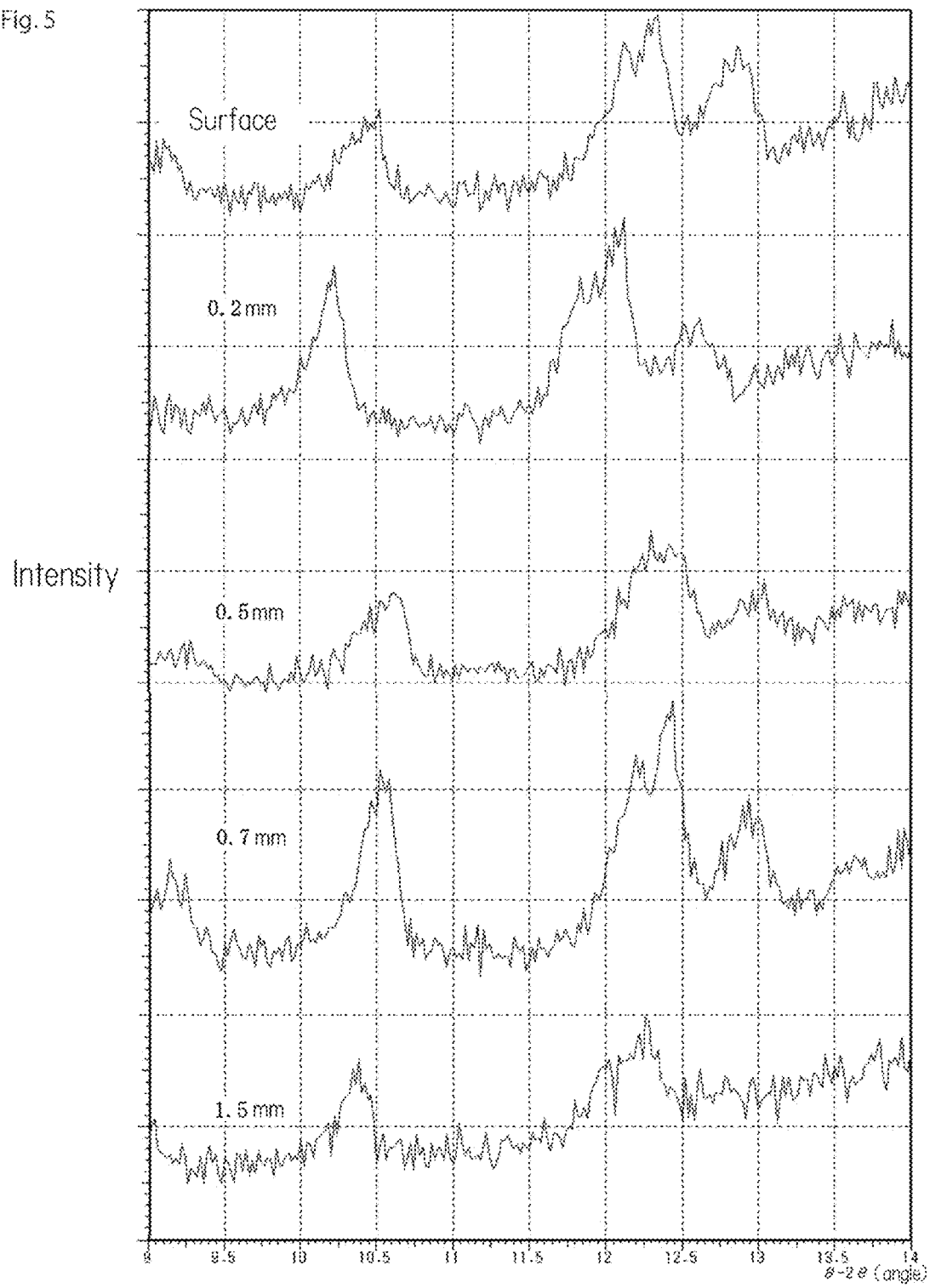
FIG. 5 is a powdered X-ray diffraction spectrum regarding the solid milk manufactured using powdered milk 2A of example 2.
Figure 6:
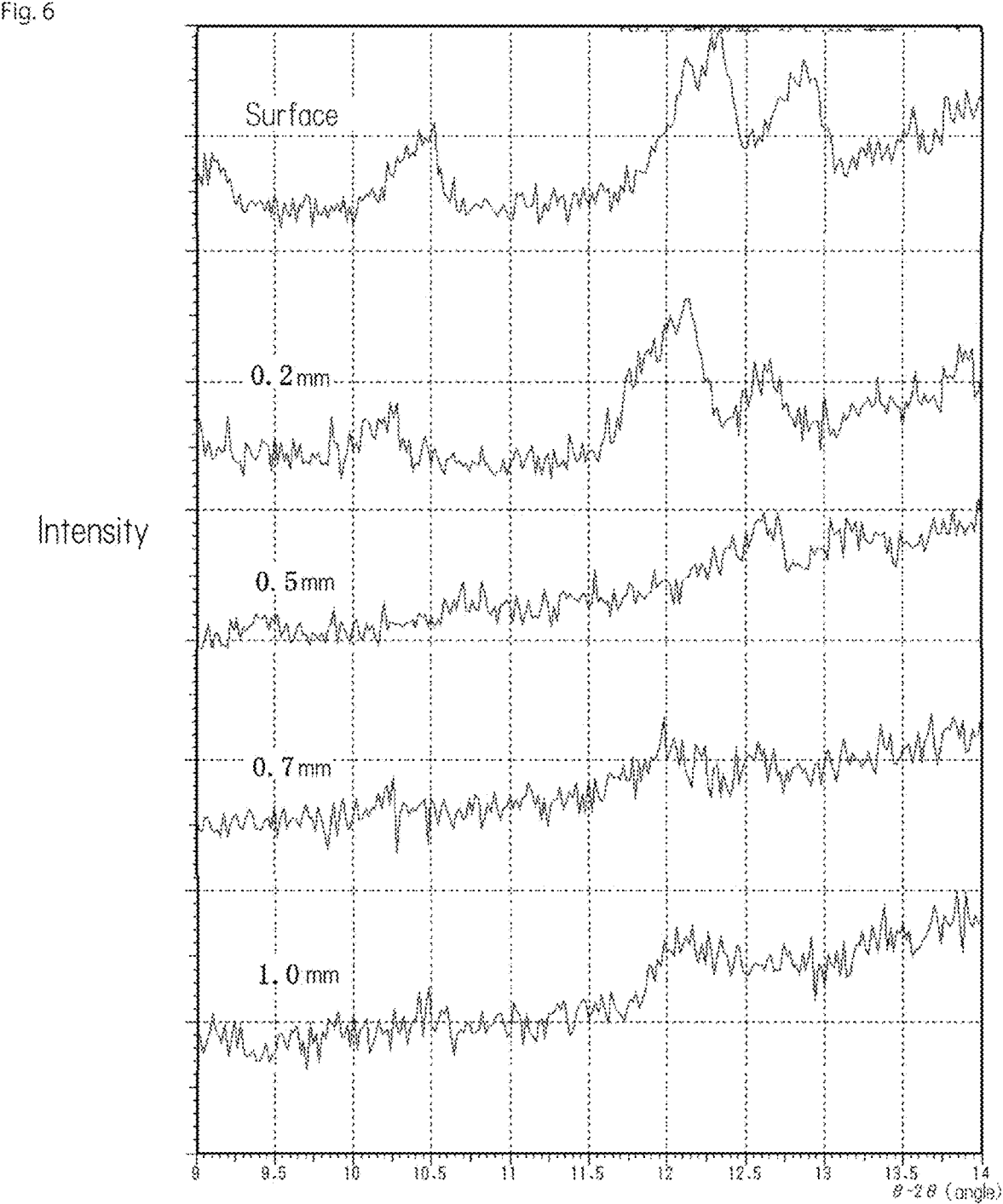
FIG. 6 is a powdered X-ray diffraction spectrum regarding the solid milk manufactured using powdered milk 2B of example 2.

FIG. 5 is a powdered X-ray diffraction spectrum regarding the solid milk manufactured using powdered milk 2A of example 2. FIG. 6 is a powdered X-ray diffraction spectrum regarding the solid milk manufactured using powdered milk 2B of example 2. Both FIG. 5 and FIG. 6 show that, from top side, X-ray powder diffraction for surface area, 0.2 mm from the surface, 0.5 mm from the surface, 0.7 mm from the surface, and 1.5 mm from the surface,

TABLE 4

| | | Powdered milk 2A | | Powdered milk 2B | |
|---|---|---|---|---|---|
| Central area | Crystalline lactose: | 3% | | 0% | |
| | Amorphous lactose: | 48% | | 51% | |
| | Total lactose: | 51% | | 51% | |
| Surface | Crystalline lactose: | 28% | (increase: 28 − 3 = 25%) | 13% | (13 − 0 = 13%) |
| | Amorphous lactose: | 23% | | 38% | |
| | Total lactose: | 51% | | 51% | |
| Whole of solid milk | Porisity: | 44.6% | | 43.9% | |
| | Hardness: | 61 N | | 34 N | |
| | Dissolved residue: | 3.3 g | | 3.5 g | |
| | Adhesion: | 5 N | | 25 N | |

We measured the amount of lactose crystal of two pieces of solid milk manufactured using powdered milk 2A and 2B at central area and surface area, which is within 0.5 mm from the surface. FIG. 7 is a graph that shows a relationship between the distance from the surface and the comprising ratio of crystalline lactose. As shown in FIG. 7, solid milk made by powdered milk 2B comprises more than 10 wt % of crystalline lactose at the surface area. As shown in FIG. 7, at the point of 0.2 mm from the surface, solid milk made by powdered milk 2B comprises less than 5 wt % of crystalline lactose. As shown in FIG. 7, solid milk made by powdered milk 2A had a hard layer with more than 1.5 mm thickness. The strength of solid milk made by powdered milk 2B was as low as 34 N, and the solid milk comprised little crystalline lactose at its surface and had a thin hard layer. Contrary, the solid milk made by powdered milk 2A which comprises 3% of crystalline lactose had much crystalline lactose at its surface and had a thick hard layer and had strength of 61 N. There was co-relationship between the amounts of crystalline lactose at the surface area of solid milk, strictly speaking which relates to increased amount of crystalline lactose; the amount of crystallized lactose after amorphous lactose is melt, and strength. We think that this is because crystalline lactose in the powdered milk, which is ingredient, acts as a core in crystallizing process and promote crystallization of amorphous lactose.

Example 3

(Technical Effect by the Existence of Crystalline Lactose 2: Surface Reforming) We manufactured three kinds of solid milk, each had porosity of 47%, by adding 0%, 0.5% and 2% of crystalline lactose (a type monohydrate crystalline lactose) to powdered milk 1 (total lactose 43%, crystalline lactose 0%, amorphous lactose 43%). We manufactured three kinds of solid milk by adding 1% of crystalline lactose, 1% of glucose, 1% of dextrin, and 1% of calcium carbonate, respectively. FIG. 8 is a graph that shows effect of attachment with various amount of crystalline lactose. Solid milk without adding crystalline lactose, which is the solid milk to which 0% of crystalline lactose was added, to powdered milk 1 had as high attaching force (adhesion) as about 14.5 N and it was not easy to remove the solid milk from a tray. Further as shown in FIG. 10m the conditions of the surface of the solid milk was bad balance of bridging and minute holes. On the contrary, solid milk made by powdered milk 1 with added crystalline lactose had less attaching force, as shown in FIG. 8, bridges and minute holes were detected at the surface of the solid milk as shown in FIG. 10. Attaching force of solid milk with added glucose, dextrin, or calcium carbonate were not lessen except for adding lactose to the powdered milk 1 as shown in FIG. 9. This indicates that by making more than 0.5% of crystalline lactose existing in the powdered milk, which is ingredient, crystallization is accelerated and minute holes at the surface increases and it is possible to lessen adhesiveness.

INDUSTRIAL APPLICABILITY

The solid milk of the present invention, when it is actually manufactured, is found to be suitable to be manufactured and marketed as commercial products, the solid milk and the method of making the same according to the present invention can be used in the foods industry such as alternative for the powdered milk and the method of making the same.

EXPLANATION OF ELEMENT NUMERAL 11 central area
12 surface area

The invention claimed is:
1. A method for the manufacture of solid milk, the method comprising steps of:
adding and mixing crystalline lactose comprising α-type monohydrate crystalline lactose and β-type anhydrous crystalline lactose into a powdered milk so that the powdered milk comprises crystalline lactose in an amount in the range of 0.5 to 10 wt. %;
compressing the powdered milk so as to obtain a solid compressed powdered milk;
humidifying the compressed powdered milk so as to obtain a humidified compressed powdered milk; and
drying the humidified compressed powdered milk so as to obtain the solid milk,
wherein:
the humidifying and drying crystallize a portion of amorphous lactose at the surface of the solid milk, forming a hard layer at the surface of the solid milk,
wherein the powdered milk comprises more than 40 wt % of lactose, and
wherein the hard layer has a thickness of 0.2 mm or more and comprises more than 10 wt % of crystalline lactose.
2. The method for the manufacture of solid milk in accordance with claim 1,
further comprising cooling the humidified compressed powdered milk before the step of drying such that the portion of amorphous lactose at the surface is crystallized.

3. The method of claim 1, wherein the mixing of the crystalline lactose into the powdered milk comprises adding the crystalline lactose into the powdered milk.

4. The method of claim 1, wherein the mixing of the crystalline lactose into the powdered milk comprises humidifying and drying granules of the powdered milk.

5. The method of claim 1, wherein the mixing of the crystalline lactose into the powdered milk comprises manufacturing the powdered milk by cooling a concentrated milk before a spray dry step.

6. The method of claim 1,
wherein the humidifying comprises exposing the compressed powdered milk to an atmosphere having a humidity of 60 to 100% RH for a duration of 5 seconds to 1 hour, and
wherein the drying comprises exposing the humidified compress powdered milk to an atmosphere having a humidity of 0 to 30% RH atmosphere for a duration of 0.2 minute to 2 hours.

7. The method of claim 1,
wherein the powdered milk comprises more than 20 wt % of amorphous lactose.

8. The method of claim 1,
wherein a fat content of the powdered milk is 5 to 70 wt %.

9. The method of claim 1,
wherein a protein content of the powdered milk is 12 to 15 wt %.

10. The method of claim 1,
wherein the powdered milk has a content of sugars other than lactose of less than 10 wt %.

11. The method of claim 1,
wherein a water content of the powdered milk is 1 to 4 wt %.

12. The solid milk that is manufactured by the method of claim 1.

13. The solid milk of claim 12,
wherein the surface of the solid milk has an X-ray diffraction pattern having a main peak of $2\theta=10\text{-}15°$ at $2\theta=10\text{-}11°$ or at $2\theta=12\text{-}13°$.

14. The solid milk of claim 12,
wherein the volume of the solid milk is from 1 to 50 cm$^3$.

15. The solid milk of claim 12,
wherein the solid milk has hardness of 40 N or more.

16. The solid milk of claim 12,
wherein the amount of crystalline lactose at the surface of the solid milk is more than 5 wt % larger than that of crystalline lactose at center area of the solid milk.

17. A method for the manufacture of a solid milk, the method comprising steps of:
compressing a powdered milk that contains amorphous lactose so as to obtain a solid compressed powdered milk;
humidifying the compressed powdered milk so as to obtain a humidified compressed powdered milk;
cooling the humidified compressed powdered milk to crystallize a portion of the amorphous lactose to obtain a cooled compressed powdered milk; and
drying the cooled compressed powdered milk so as to obtain the solid milk,
wherein the powdered milk comprises more than 40 wt % of lactose,
wherein the cooling forms 0.5 mm or more of a hard layer at the surface of the solid milk,
the hard layer comprises more than 10 wt % of crystalline lactose,
wherein the crystalline lactose comprises α-type monohydrate crystalline lactose and β-type anhydrous crystalline lactose, and
wherein the powdered milk comprises the crystalline lactose in an amount in the range of 0.5 to 10 wt. %.

18. The method of claim 17,
further comprising mixing the powdered milk with crystalline lactose before performing the compressing step.

19. The method of claim 17,
wherein the humidifying comprises exposing the compressed powdered milk to an atmosphere having a humidity of 60 to 100% RH for a duration of 5 seconds to 1 hour, and
wherein the drying comprises exposing the humidified compress powdered milk to an atmosphere having a humidity of 0 to 30% RH atmosphere for a duration of 0.2 minute to 2 hours.

* * * * *